United States Patent
Zhang et al.

(10) Patent No.: US 12,154,545 B2
(45) Date of Patent: Nov. 26, 2024

(54) AUDIO INFORMATION PROCESSING METHOD, AUDIO INFORMATION PROCESSING APPARATUS, ELECTRONIC DEVICE, AND STORAGE MEDIUM

(71) Applicant: Alibaba Group Holding Limited, Grand Cayman (KY)

(72) Inventors: Shiliang Zhang, Hangzhou (CN); Ming Lei, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 230 days.

(21) Appl. No.: 17/789,055

(22) PCT Filed: Jan. 8, 2021

(86) PCT No.: PCT/CN2021/070879
§ 371 (c)(1),
(2) Date: Jun. 24, 2022

(87) PCT Pub. No.: WO2021/139772
PCT Pub. Date: Jul. 15, 2021

(65) Prior Publication Data
US 2023/0047378 A1      Feb. 16, 2023

(30) Foreign Application Priority Data
Jan. 10, 2020   (CN) .......................... 202010026971.9

(51) Int. Cl.
*G10L 15/02* (2006.01)
*G10L 13/00* (2006.01)
*G10L 15/00* (2013.01)

(52) U.S. Cl.
CPC ............ *G10L 15/005* (2013.01); *G10L 13/00* (2013.01)

(58) Field of Classification Search
CPC . G05B 15/02; G05B 19/4065; G06F 16/2365; G06F 3/0481; G06F 3/04886;
(Continued)

(56) References Cited

U.S. PATENT DOCUMENTS

| | | |
|---|---|---|
| 5,640,490 A | 6/1997 | Hansen et al. |
| 5,680,130 A | 10/1997 | Tsutsui et al. |

(Continued)

FOREIGN PATENT DOCUMENTS

| | | |
|---|---|---|
| CN | 1623289 | 6/2005 |
| CN | 1661675 | 8/2005 |

(Continued)

OTHER PUBLICATIONS

Meng Zhong et al: "Character-Aware Attention-Based End-to-End Speech Recognition," 2019 IEEE Automatic Speech Recognition and Understanding Workshop (ASRU), IEEE, Dec. 14, 2019 (Dec. 14, 2019), pp. 949-955.

(Continued)

*Primary Examiner* — Gerald Gauthier

(57) ABSTRACT

In various embodiments, this application provides an audio information processing method, an audio information processing apparatus, an electronic device, and a storage medium. An audio information processing method in an embodiment includes: obtaining a first audio feature corresponding to audio information; performing, based on an audio feature at a specified moment in the first audio feature and audio features adjacent to the audio feature at the specified moment, an encoding on the audio feature at the specified moment to obtain a second audio feature corresponding to the audio information; obtaining decoded text information corresponding to the audio information; and obtaining, based on the second audio features and the decoded text information, text information corresponding to (Continued)

the audio information. According to this method, fewer parameters are used in the process of obtaining the second audio feature and obtaining, based on the second audio feature and the decoded text information, the text information corresponding to the audio information, thereby reducing computational complexity in the audio information processing process and improving audio information processing efficiency.

20 Claims, 6 Drawing Sheets

(58) Field of Classification Search
CPC .............. G06F 16/2457; G06F 16/901; G06F 18/2413; G06N 3/044; G06N 3/08; G06N 3/045; G10L 13/00; G10L 13/033; G10L 13/10; G10L 15/005; G10L 15/02; G10L 15/10; G10L 15/16; G10L 15/1822; G10L 15/22; G10L 15/28; G10L 19/008; G10L 25/18; G10L 25/21; G10L 25/30; G10L 2015/025; G10L 2015/223; G10L 2015/225; G10L 13/047; G10L 15/285; H04S 7/30; A41B 1/08; G06Q 30/0641; G06Q 50/01; G09B 5/06; G09B 5/12; G09B 19/0053; G11B 27/005; G16H 50/20; H04L 65/612; H04L 65/613; H04L 65/762; H04L 67/01; H04L 67/10; H04N 21/2368

See application file for complete search history.

(56) References Cited

U.S. PATENT DOCUMENTS

| | | | |
|---|---|---|---|
| 5,706,290 | A | 1/1998 | Shaw et al. |
| 6,549,147 | B1 | 4/2003 | Moriya et al. |
| 7,027,808 | B2 | 4/2006 | Wesby |
| 9,293,130 | B2* | 3/2016 | Amini ................. G10L 15/02 |
| 9,531,794 | B2* | 12/2016 | Pogodin ............ G09B 19/0053 |
| 10,245,698 | B2* | 4/2019 | Jeong ................ G05B 19/4065 |
| 10,332,508 | B1* | 6/2019 | Hoffmeister ............ G06N 3/08 |
| 10,475,438 | B1* | 11/2019 | Chicote ................ G10L 13/033 |
| 10,796,686 | B2 | 10/2020 | Arik et al. |
| 10,825,318 | B1* | 11/2020 | Williams .............. G16H 50/20 |
| 10,872,596 | B2 | 12/2020 | Ping et al. |
| 11,020,861 | B2 | 6/2021 | Song et al. |
| 11,062,694 | B2* | 7/2021 | Nicolis ................. G10L 13/10 |
| 11,322,142 | B2* | 5/2022 | Yin ....................... G10L 25/21 |
| 11,468,244 | B2* | 10/2022 | Kannan ................ G06N 3/044 |
| 11,514,948 | B1* | 11/2022 | Nair .................... G06F 16/2365 |
| 11,687,315 | B2* | 6/2023 | Zalon ................... G05B 15/02 |
| | | | 700/94 |
| 11,727,913 | B2* | 8/2023 | Verma .................. G10L 13/047 |
| | | | 704/260 |
| 11,749,281 | B2* | 9/2023 | Krishnaswamy ... G10L 15/1822 |
| | | | 704/2 |
| 11,922,974 | B1* | 3/2024 | Plankey ............... G06Q 30/0641 |
| 2003/0055634 | A1 | 3/2003 | Hidaka et al. |
| 2005/0114121 | A1* | 5/2005 | Tsingos .................. H04S 7/30 |
| | | | 704/220 |
| 2005/0222933 | A1 | 10/2005 | Wesby |
| 2006/0136565 | A1 | 6/2006 | Rhoads |
| 2007/0032894 | A1* | 2/2007 | Uenishi .............. G11B 27/005 |
| 2007/0124789 | A1 | 5/2007 | Sachson et al. |
| 2008/0022343 | A1* | 1/2008 | Hodzic ............... H04N 21/2368 |
| | | | 725/115 |
| 2008/0120676 | A1 | 5/2008 | Morad et al. |
| 2009/0154556 | A1 | 6/2009 | Kim et al. |
| 2009/0172128 | A1 | 7/2009 | Rhoads |
| 2010/0051693 | A1 | 3/2010 | Dubina |
| 2013/0028400 | A1* | 1/2013 | Fix ........................ G09B 5/12 |
| | | | 379/88.13 |
| 2013/0110806 | A1* | 5/2013 | Cai ..................... G06F 16/901 |
| | | | 707/706 |
| 2014/0093086 | A1 | 4/2014 | Zhao et al. |
| 2014/0281013 | A1* | 9/2014 | Thang .................. H04L 65/613 |
| | | | 709/231 |
| 2015/0026242 | A1* | 1/2015 | Lim ..................... H04L 65/612 |
| | | | 709/203 |
| 2015/0122879 | A1* | 5/2015 | Kawasato ............. H04L 67/01 |
| | | | 235/375 |
| 2015/0147048 | A1* | 5/2015 | Kim .................... G06F 3/04886 |
| | | | 386/282 |
| 2015/0177940 | A1 | 6/2015 | Trevino et al. |
| 2016/0320922 | A1* | 11/2016 | Kim ...................... H04L 67/10 |
| 2017/0105086 | A1 | 4/2017 | Wesby |
| 2017/0126767 | A1* | 5/2017 | Cai ..................... H04L 65/762 |
| 2017/0358237 | A1* | 12/2017 | Yuen .................... G06F 3/0481 |
| 2018/0122251 | A1* | 5/2018 | Shi ..................... G09B 5/06 |
| 2018/0174589 | A1 | 6/2018 | Choi et al. |
| 2018/0217991 | A1* | 8/2018 | Dato ................. G06F 16/24578 |
| 2018/0261225 | A1* | 9/2018 | Watanabe .............. G10L 15/28 |
| 2018/0330718 | A1* | 11/2018 | Hori .................... G06N 3/08 |
| 2019/0057530 | A1* | 2/2019 | Yochum ................ A41B 1/08 |
| 2019/0057683 | A1* | 2/2019 | Sak ....................... G10L 15/22 |
| 2019/0122651 | A1 | 4/2019 | Arik et al. |
| 2019/0152065 | A1 | 5/2019 | Song et al. |
| 2019/0180732 | A1 | 6/2019 | Ping et al. |
| 2019/0189111 | A1* | 6/2019 | Watanabe .............. G10L 15/16 |
| 2019/0189115 | A1* | 6/2019 | Hori ..................... G10L 15/22 |
| 2019/0279036 | A1* | 9/2019 | Pan ..................... G06F 18/2413 |
| 2019/0318725 | A1* | 10/2019 | Le Roux ............... G10L 15/16 |
| 2019/0370316 | A1 | 12/2019 | Kong |
| 2020/0043483 | A1* | 2/2020 | Prabhavalkar .......... G10L 15/16 |
| 2020/0090642 | A1* | 3/2020 | Lee .................... G10L 15/02 |
| 2020/0219486 | A1* | 7/2020 | Fu ....................... G10L 15/10 |
| 2020/0242182 | A1* | 7/2020 | Gokyigit ............... G06Q 50/01 |
| 2020/0265831 | A1* | 8/2020 | Wang .................. G10L 15/16 |
| 2020/0349923 | A1* | 11/2020 | Hu ...................... G10L 25/30 |
| 2020/0402501 | A1* | 12/2020 | Prabhavalkar .......... G10L 15/16 |
| 2021/0183373 | A1* | 6/2021 | Moritz .................. G10L 15/22 |
| 2022/0189493 | A1* | 6/2022 | Purnhagen ............ G10L 19/008 |
| 2023/0047378 | A1* | 2/2023 | Lin ....................... G10L 15/005 |

FOREIGN PATENT DOCUMENTS

| | | |
|---|---|---|
| CN | 101178897 A | 5/2008 |
| CN | 101740030 A | 6/2010 |
| CN | 102257564 | 11/2011 |
| CN | 102708862 | 10/2012 |
| CN | 103123787 A | 5/2013 |
| CN | 103236260 A | 8/2013 |
| CN | 107170453 A | 9/2017 |
| CN | 107871497 | 4/2018 |
| CN | 108417202 A | 8/2018 |
| CN | 109509475 | 3/2019 |
| CN | 110197658 A | 9/2019 |
| CN | 110444223 A | 11/2019 |
| JP | 2001242890 | 9/2001 |
| JP | 2017090789 | 5/2017 |
| KR | 20080012000 | 2/2008 |

OTHER PUBLICATIONS

He Yanzhang et al, "Streaming End-to-end Speech Recognition for Mobile Devices," ICASSP 2019-2019 IEEE International Conference On Acoustics, Speech and Signal Processing (ICASSP), IEEE, May 12, 2019 (May 12, 2019), pp. 6381-6385.

Ian Williams et al, "Contextual Speech Recognition in End-to-end Neural Network Systems Using Beam Search," INTERSPEECH 2018, Jan. 1, 2018 (Jan. 1, 2018), pp. 2227-2231.

* cited by examiner

AUDIO INFORMATION PROCESSING METHOD, AUDIO INFORMATION PROCESSING APPARATUS, ELECTRONIC DEVICE, AND STORAGE MEDIUM

CROSS-REFERENCE TO RELATED APPLICATIONS

This is a continuation application of co-pending PCT Application No. PCT/CN2021/070879, PCT filing date Jan. 8, 2021 by Shilaing ZHANG et al., which claims priority to Chinese Application No. 202010026971.9, filed Jan. 10, 2020, which are hereby incorporated by reference.

TECHNICAL FIELD

This application relates to the field of computer technologies, and specifically to an audio information processing method, an audio information processing apparatus, an electronic device, and a storage medium.

BACKGROUND

With the development of computer technologies and Internet of Things technologies, more and more smart devices have begun to support human-machine speech interaction. In the process of human-machine speech interaction, a smart device needs to collect speech information related to user instructions, and further make corresponding feedback according to user instructions, so as to realize human-machine speech interaction. In the process of human-machine speech interaction between a user and the smart device, how the smart device recognizes speech information related to user instructions becomes a key to completing the human-machine speech interaction. Traditional speech recognition methods are generally based on ASR (Automatic Speech Recognition, automatic speech recognition technology) speech recognition technology, have a cumbersome training process and require introduction of lots of artificially defined prior knowledge. In addition, the traditional speech recognition methods need to train an acoustic model and a language model separately, which does not allow for benefits of joint optimization.

In recent years, end-to-end speech recognition methods have received growing attention in the field of speech recognition. In the end-to-end speech recognition method, the acoustic model and the language model in the traditional speech recognition method are unified, and text information corresponding to audio information can be obtained directly based on the audio information, so that a speech recognition process is simplified. Existing end-to-end speech recognition methods are mainly based on neural networks such as an RNN (Recurrent Neural Network, recurrent neural network) or a CNN (Convolutional Neural Networks, convolutional neural network). However, the end-to-end speech recognition methods based on an RNN or a CNN usually have a problem of low speech recognition efficiency due to high computational complexity.

SUMMARY

In various embodiments, this application provides an audio information processing method, an audio information processing apparatus, an electronic device, and a storage medium, to reduce computational complexity in a process of audio information processing and improve audio information processing efficiency.

An embodiment of this application provides an audio information processing method, including:
obtaining a first audio feature corresponding to audio information;
performing, based on an audio feature at a specified moment in the first audio feature and audio features adjacent to the audio feature at the specified moment, an encoding on the audio feature at the specified moment, to obtain a second audio feature corresponding to the audio information;
obtaining decoded text information corresponding to the audio information; and
obtaining, based on the second audio feature and the decoded text information, text information corresponding to the audio information.

Optionally, the performing, based on an audio feature at a specified moment in the first audio feature and audio features adjacent to the audio feature at the specified moment, an encoding on the audio feature at the specified moment includes:
selecting audio features at a plurality of target moments from the audio features adjacent to the audio feature at the specified moment; and performing, based on the audio feature at the specified moment and the audio features at the plurality of the target moments, an encoding on the audio feature at the specified moment.

Optionally, the performing, based on the audio feature at the specified moment and the audio features at the plurality of the target moments, an encoding on the audio feature at the specified moment includes:
performing, based on the audio feature at the specified moment and the audio features at the plurality of the target moments, a first encoding on the audio feature at the specified moment, to obtain a first encoded audio feature corresponding to the first audio feature;
performing, based on a first encoded audio feature corresponding to the audio feature at the specified moment and first encoded audio features corresponding to the audio features at the plurality of the target moments, a second encoding on the audio feature at the specified moment, to obtain a second encoded audio feature corresponding to the first audio feature, and performing the foregoing steps in sequence until the number of encodings reaches a specified number of encodings, to complete encoding of the audio feature at the specified moment; and
using a final encoded audio feature corresponding to the first audio feature as the second audio feature.

Optionally, the performing, based on the audio feature at the specified moment and the audio features at the plurality of the target moments, a first encoding on the audio feature at the specified moment, to obtain a first encoded audio feature corresponding to the first audio feature includes:
performing the first encoding based on a linear audio feature at the specified moment, a nonlinear audio feature at the specified moment, linear audio features at the plurality of the target moments, and nonlinear audio features at the plurality of the target moments, to obtain the first encoded audio feature corresponding to the first audio feature.

Optionally, the performing, based on a first encoded audio feature corresponding to the audio feature at the specified moment and first encoded audio features corresponding to the audio features at the plurality of the target moments, a second encoding on the audio feature at the specified moment, to obtain a second encoded audio feature corresponding to the first audio feature includes: performing the second encoding based on a first encoded linear audio feature corresponding to the audio feature at the specified moment, a first encoded nonlinear audio feature corresponding to the audio feature at the specified moment, first encoded linear audio features corresponding to the audio features at the plurality of the target moments, and first encoded nonlinear audio features corresponding to the audio features at the plurality of the target moments, to obtain the second encoded audio feature corresponding to the first audio feature.

Optionally, the audio information processing method further includes:

performing linear transformation on the first encoded audio feature corresponding to the first audio feature, to obtain a first encoded linear audio feature corresponding to the first audio feature; and performing linear rectification on the first encoded linear audio feature corresponding to the first audio feature, to obtain a first encoded nonlinear audio feature corresponding to the first audio feature.

Optionally, the selecting audio features at a plurality of target moments from the audio features adjacent to the audio feature at the specified moment includes:

determining a range of the audio features adjacent to the audio feature at the specified moment; and selecting, based on the range of the audio features adjacent to the audio feature at the specified moment, the audio features at the plurality of the target moments from the audio features adjacent to the audio feature at the specified moment.

Optionally, the determining a range of the audio features adjacent to the audio feature at the specified moment includes: determining a first range of audio features that are adjacent to the audio feature at the specified moment and before the audio feature at the specified moment, and determining a second range of audio features that are adjacent to the audio feature at the specified moment and after the audio feature at the specified moment; and the selecting, based on the range of the audio features adjacent to the audio feature at the specified moment, the audio features at the plurality of the target moments from the audio features adjacent to the audio feature at the specified moment includes: selecting, based on the first range and the second range, the audio features at the plurality of the target moments from the audio features adjacent to the audio feature at the specified moment.

Optionally, the selecting, based on the first range and the second range, the audio features at the plurality of the target moments from the audio features adjacent to the audio feature at the specified moment includes:

determining a step factor, where the step factor is used to indicate a value-taking time interval when the audio features at the plurality of the target moments are selected from the audio features adjacent to the audio features of the specified moment; and selecting, based on the step factor, the first range, and the second range, the audio features at the plurality of the target moments from the audio features adjacent to the audio feature at the specified moment.

Optionally, the selecting, based on the step factor, the first range, and the second range, the audio features at the plurality of the target moments from the audio features adjacent to the audio feature at the specified moment includes: selecting, based on a first step factor and the first range, the audio features at the plurality of the target moments from the audio features adjacent to the audio feature at the specified moment.

Optionally, the selecting, based on the step factor, the first range, and the second range, the audio features at the plurality of the target moments from the audio features adjacent to the audio feature at the specified moment includes: selecting, based on a second step factor and the second range, the audio features at the plurality of the target moments from the audio features adjacent to the audio feature at the specified moment.

Optionally, the obtaining, based on the second audio feature and the decoded text information, text information corresponding to the audio information includes: performing, based on the second audio feature and the decoded text information, a decoding on to-be-decoded audio information corresponding to second audio information, to obtain the text information corresponding to the audio information.

Optionally, the performing, based on the second audio feature and the decoded text information, a decoding on to-be-decoded audio information corresponding to second audio information, to obtain the text information corresponding to the audio information includes:

obtaining first to-be-decoded audio information corresponding to the second audio feature;

performing, based on the second audio feature and the decoded text information, a decoding on the first to-be-decoded audio information, to obtain first decoded text information;

obtaining second to-be-decoded audio information corresponding to the second audio feature; updating the first decoded text information to decoded information; and performing, based on the second audio feature and the decoded text information, a decoding on the second to-be-decoded audio information, to obtain second decoded text information, and performing the foregoing steps in sequence until all to-be-decoded information corresponding to the second audio information is decoded, to obtain the text information corresponding to the audio information.

Optionally, the decoded information includes indication information for indicating decoding of to-be-decoded audio information corresponding to the second audio information.

Optionally, the performing, based on the second audio feature and the decoded text information, a decoding on the first to-be-decoded audio information, to obtain first decoded text information includes:

performing, based on the second audio feature and the decoded text information, a decoding on the first to-be-decoded audio information, to obtain text information corresponding to the first to-be-decoded audio information; and obtaining, based on the text information corresponding to the first to-be-decoded audio information and the decoded text information, the first decoded text information.

Optionally, the performing, based on the second audio feature and the decoded text information, a decoding on the first to-be-decoded audio information, to obtain text information corresponding to the first to-be-decoded audio information includes:

obtaining, based on the second audio feature and the decoded text information, a predicted value of a text unit corresponding to the first to-be-decoded audio information;

obtaining a probability distribution of the text unit; and obtaining a text unit with a largest probability value as the text information corresponding to the first to-be-decoded audio information.

Optionally, the obtaining a first audio feature corresponding to audio information includes:

obtaining the audio information; and performing feature extraction on the audio information to obtain the first audio feature.

Optionally, the performing feature extraction on the audio information to obtain the first audio feature includes: performing feature extraction on the audio information to obtain a first audio feature sequence corresponding to the audio information.

Optionally, the audio information processing method further includes: outputting text information corresponding to the audio information.

According to another embodiment of this application, an audio information processing apparatus is further provided, including:

a first audio feature obtaining unit, adapted to obtain a first audio feature corresponding to audio information;

a second audio feature obtaining unit, adapted to perform, based on an audio feature at a specified moment in the first audio feature and audio features adjacent to the audio feature at the specified moment, an encoding on the audio feature at the specified moment, to obtain a second audio feature corresponding to the audio information;

a decoded text information obtaining unit, adapted to obtain decoded text information corresponding to the audio information; and a text information obtaining unit, adapted to obtain, based on the second audio feature and the decoded text information, text information corresponding to the audio information.

According to yet another embodiment of this application, an electronic device is further provided, including: a processor; and a memory coupled to the processor, the memory adapted or operable to store a program of an audio information processing method, where running the program of the audio information processing method via the processor, the device performs the following steps:

obtaining a first audio feature corresponding to audio information;

performing, based on an audio feature at a specified moment in the first audio feature and audio features adjacent to the audio feature at the specified moment, an encoding on the audio feature at the specified moment, to obtain a second audio feature corresponding to the audio information;

obtaining decoded text information corresponding to the audio information; and obtaining, based on the second audio feature and the decoded text information, text information corresponding to the audio information.

According to still another embodiment of this application, an storage device is further provided, storing a program of an audio information processing method, where when the program is executed by a processor, the following steps are performed: obtaining a first audio feature corresponding to audio information;

performing, based on an audio feature at a specified moment in the first audio feature and audio features adjacent to the audio feature at the specified moment, an encoding on the audio feature at the specified moment, to obtain a second audio feature corresponding to the audio information;

obtaining decoded text information corresponding to the audio information; and obtaining, based on the second audio feature and the decoded text information, text information corresponding to the audio information.

According to another embodiment of this application, a smart speaker is further provided, including: an audio collection device and an audio recognition device, where the audio recognition device includes: an audio feature extraction module, an audio feature encoding module, a decoded text storage module, and an audio feature encoding module;

the audio collection device is adapted to obtain audio information;

the audio feature extraction module is adapted to obtain a first audio feature corresponding to the audio information;

the audio feature encoding module is adapted to perform, based on an audio feature at a specified moment in the first audio feature and audio features adjacent to the audio feature at the specified moment, an encoding on the audio feature at the specified moment, to obtain a second audio feature corresponding to the audio information;

the decoded text storage module is adapted to obtain decoded text information corresponding to the audio information; and the audio feature encoding module is adapted to obtain, based on the second audio feature and the decoded text information, text information corresponding to the audio information.

According to yet another embodiment of this application, an in-vehicle smart speech interaction apparatus is further provided, including: an audio collection device, an audio recognition device, and an execution device, where the audio recognition device includes: an audio feature extraction module, an audio feature encoding module, a decoded text storage module, and an audio feature encoding module;

the audio collection device is adapted to obtain audio information;

the audio feature extraction module is adapted to obtain a first audio feature corresponding to the audio information;

the audio feature encoding module is adapted to perform, based on an audio feature at a specified moment in the first audio feature and audio features adjacent to the audio feature at the specified moment, an encoding on the audio feature at the specified moment, to obtain a second audio feature corresponding to the audio information;

the decoded text storage module is adapted to obtain decoded text information corresponding to the audio information;

the audio feature encoding module is adapted to obtain, based on the second audio feature and the decoded text information, text information corresponding to the audio information; and the execution device is adapted to execute, based on the text information corresponding to the audio information, a corresponding instruction.

According to still another embodiment of this application, an audio information processing system is further provided, including: a client and a server, where the client is adapted to obtain audio information and send the audio information to the server; and the server is adapted to: obtain a first audio feature corresponding to the audio information; perform, based on an audio feature at a specified moment in the first audio feature and audio features adjacent to the audio feature at the specified moment, an encoding on the audio feature at the specified moment, to obtain a second audio feature corresponding to the audio information; obtain decoded text information corresponding to the audio information; obtain, based on the second audio feature and the decoded text information, text information corresponding to the audio information; and send the text information corresponding to the audio information to the client.

Compared with the conventional art, various embodiments of this application have the following advantages:

The audio information processing method provided in an embodiment of this application firstly obtains a first audio feature corresponding to audio information; secondly, performs, based on an audio feature at a specified moment in the first audio feature and audio features adjacent to the audio feature at the specified moment, an encoding on the audio feature at the specified moment to obtain a second audio feature corresponding to the audio information; thirdly, obtains decoded text information corresponding to the audio information; and finally, obtains, based on the second audio feature and the decoded text information, text information corresponding to the audio information. The audio information processing method provided in an embodiment of this application can perform, based on the audio feature at the specified moment in the first audio feature and the audio features adjacent to the audio feature at the specified moment, an encoding on the audio feature at the specified moment in the first audio feature, to obtain the second audio feature corresponding to the audio information, and further based on the second audio feature and the decoded text information, obtain the text information corresponding to the audio information. According to the audio information processing method provided in an embodiment of this application, fewer parameters need to be used in the process of obtaining the second audio feature and obtaining, based on the second audio feature and the decoded text information, the text information corresponding to the audio information, thereby reducing computational complexity in the audio information processing process and improving audio information processing efficiency.

DETAILED DESCRIPTION

In the following descriptions, many specific details are provided to help thoroughly understand various embodiments in accordance with the present disclosure. However, the present disclosure can be implemented in many other manners different from those described herein. A person skilled in the art can make similar expansions without departing from the connotation of the present disclosure. Therefore, the present disclosure is not limited by the specific embodiments disclosed below.

Figure 1:
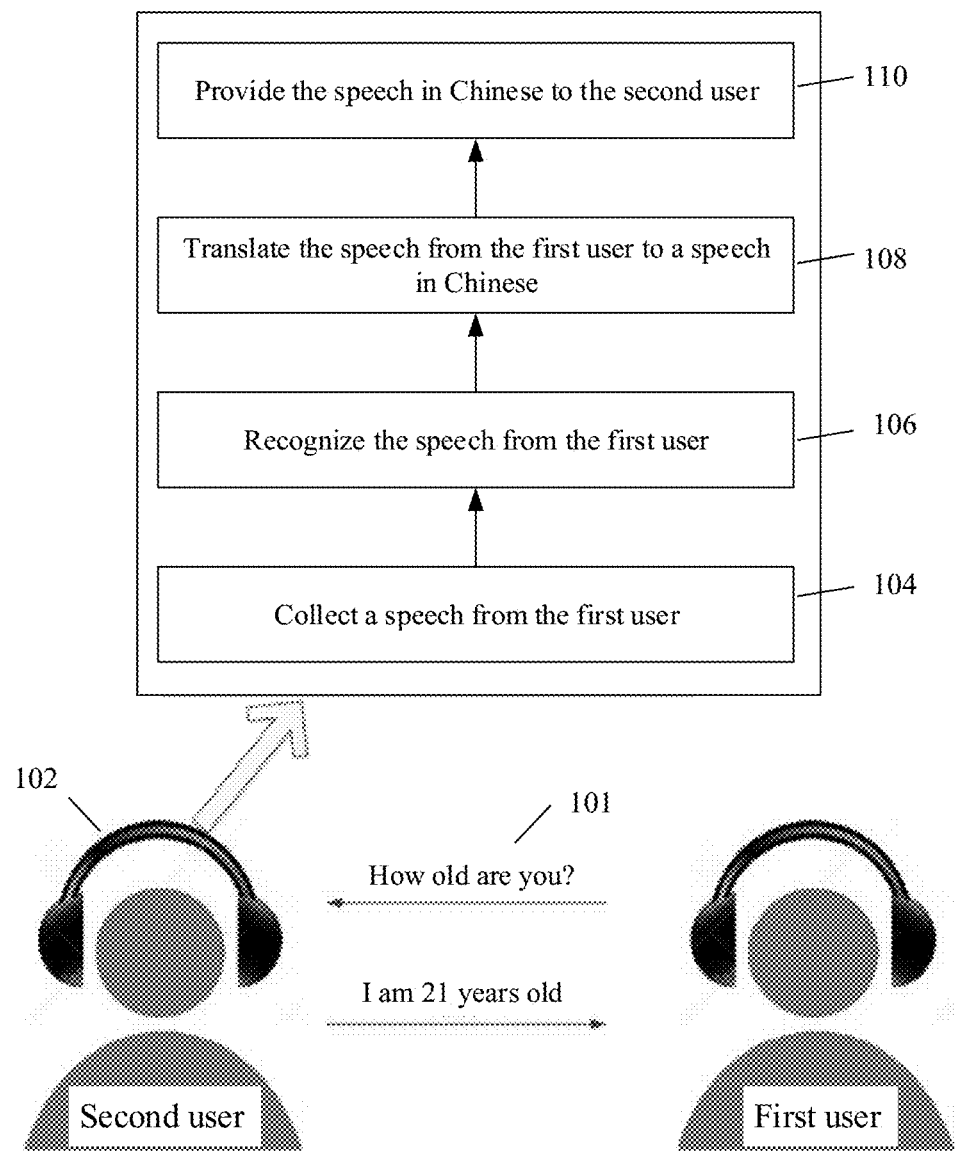
FIG. 1 is a schematic diagram of an embodiment of a first application scenario of an audio information processing method according to this application.

To describe an audio information processing method provided in an embodiment of this application more clearly, an application scenario of the audio information processing method provided in this application is first described. The audio information processing method provided in an embodiment of this application can be applied to a machine translation scenario. FIG. 1 is a schematic diagram of an embodiment of a first application scenario of an audio information processing method according to this application. In this embodiment of the first scenario of this application, the audio information processing method provided in this application is described in detail by specifically using an application scenario as an example in which the audio information processing method provided in this application is applied to a simultaneous translation headset 102. When the audio information processing method provided in an embodiment of this application is applied to a simultaneous translation headset 102, the audio information is speech information of a user (e.g., a first user).

When the user (e.g., a second user) uses the simultaneous translation headset 102 to conduct a conversation, the simultaneous translation headset 102 is capable of collecting at 104 speech information 101 of a target user (e.g., a first user) through its built-in sound collection device. After the speech information 101 of the target user is collected at 104, the simultaneous translation headset 102 first recognizes a language corresponding to the speech at 106, and further determines at 106 whether the language of the speech is a to-be-translated language preset by the user. If so, the simultaneous translation headset 102 will process the speech information of the user, recognize and translate the speech information at 108.

A specific process of recognizing the speech information of the target user by the simultaneous translation headset 102 is as follows: Firstly, noise reduction processing is performed on the speech information 101, and after the noise reduction processing, acoustic feature extraction is further performed on the speech information 101 to obtain a first speech feature corresponding to the speech information 101, where the first speech feature is specifically a sequence of speech features, that is, speech features of the speech information in N speech frames, where the speech features include phonetic features of the speech, spectral features of the speech, and the like. Secondly, an encoding unit of the simultaneous translation headset 102 performs, based on a speech feature at a specified moment in the first speech feature and speech features adjacent to the speech feature at the specified moment, an encoding on the speech feature at the specified moment, to obtain a second speech feature corresponding to the speech information 101. In an embodiment of a scenario of this application, the specified moment is determined according to a preset number of encodings and an audio length. Specifically, a time interval for encoding is calculated based on the audio length and the preset number of encodings, one moment is selected as a starting moment, and each specified moment can be obtained based on the starting moment, the number of encodings, and the time interval. Thirdly, a decoding unit of the simultaneous translation headset 102 obtains the second speech feature, and uses decoded text information corresponding to the speech information 101 as an output of decoded speech information in the decoded speech information, where decoded information may be indication information for indicating decoding of to-be-decoded speech information corresponding to second speech information. Finally, the decoding unit of the simultaneous translation headset 102 obtains, based on the second speech feature and the decoded text information, text information corresponding to the speech information 101.

It should be noted that a specific process of performing, by the encoding unit of the simultaneous translation headset 102 based on a speech feature at a specified moment in the first speech feature and speech features adjacent to the speech feature at the specified moment, an encoding on the speech feature at the specified moment, to obtain a second speech feature corresponding to the speech information is as follows: firstly, selecting speech features at a plurality of target moments from the speech features adjacent to the speech feature at the specified moment; secondly, performing, based on the speech feature at the specified moment and the speech features at the plurality of the target moments, a first encoding on the speech feature at the specified moment, to obtain a first encoded speech feature corresponding to the first speech feature; obtaining, based on a first encoded speech feature corresponding to the speech feature at the specified moment and first encoded speech features corresponding to the audio features at the plurality of the target moments, a second encoded speech feature corresponding to the first speech feature, and performing the foregoing steps in sequence until the number of encodings reaches a specified number of encodings, to complete encoding of the speech feature at the specified moment; and using a final encoded speech feature corresponding to the first speech feature as the second speech feature.

A specific process of performing a first encoding on the speech feature at the specified moment to obtain a first encoded speech feature corresponding to the first speech feature is as follows: performing the first encoding based on a linear speech feature at the specified moment, a nonlinear speech feature at the specified moment, linear speech features at the plurality of the target moments, and nonlinear speech features at the plurality of the target moments, to obtain the first encoded speech feature corresponding to the first speech feature.

A specific process of performing an N-th encoding on the speech feature at the specified moment to obtain an N-th encoded speech feature corresponding to the first speech feature is as follows: performing the N-th encoding based on an (N−1)-th encoded linear speech feature corresponding to the speech feature at the specified moment, an (N−1)-th encoded nonlinear speech feature corresponding to the speech feature at the specified moment, (N−1)-th encoded linear speech features corresponding to the speech features at the plurality of the target moments, and (N−1)-th encoded nonlinear speech features corresponding to the speech features at the plurality of the target moments, to obtain the N-th encoded speech feature corresponding to the first speech feature, where N is a preset number of encodings.

It should be noted that a specific process of obtaining, based on the second speech feature and the decoded text information, text information corresponding to the speech information is as follows: obtaining first to-be-decoded speech information corresponding to the second speech feature after the decoding unit of the simultaneous translation headset 102 obtains the second speech feature and the decoded text information; performing, based on the second speech feature and the decoded text information, a decoding on the first to-be-decoded speech information, to obtain first decoded text information; obtaining second to-be-decoded speech information corresponding to the second speech feature; updating the first decoded text information to decoded information; and performing, based on the second speech feature and the decoded text information, a decoding on the second to-be-decoded speech information, to obtain second decoded text information, and performing the foregoing steps in sequence until all to-be-decoded information corresponding to second speech information is decoded, to obtain the text information corresponding to the speech information. When performing, based on the second speech feature and the decoded text information, a decoding on the first to-be-decoded speech information, to obtain first decoded text information, firstly, the decoding unit obtains, based on the second speech feature and the decoded text information, a predicted value of a text unit corresponding to the first to-be-decoded speech information; then obtains a probability distribution of the text unit; and finally, obtains a text unit with a largest probability value as text information corresponding to the first to-be-decoded speech information.

After obtaining the text information corresponding to the speech information, the decoding unit of the simultaneous translation headset 102 provides the text information corresponding to the speech information to a translation module unit of the simultaneous translation headset 102. The translation module unit at 108 performs translation for the text information corresponding to the speech information, translates the text information corresponding to the speech information into text information in a preset language, converts the text information into speech information in the preset language, and outputs at 110 the speech information.

Figure 2:
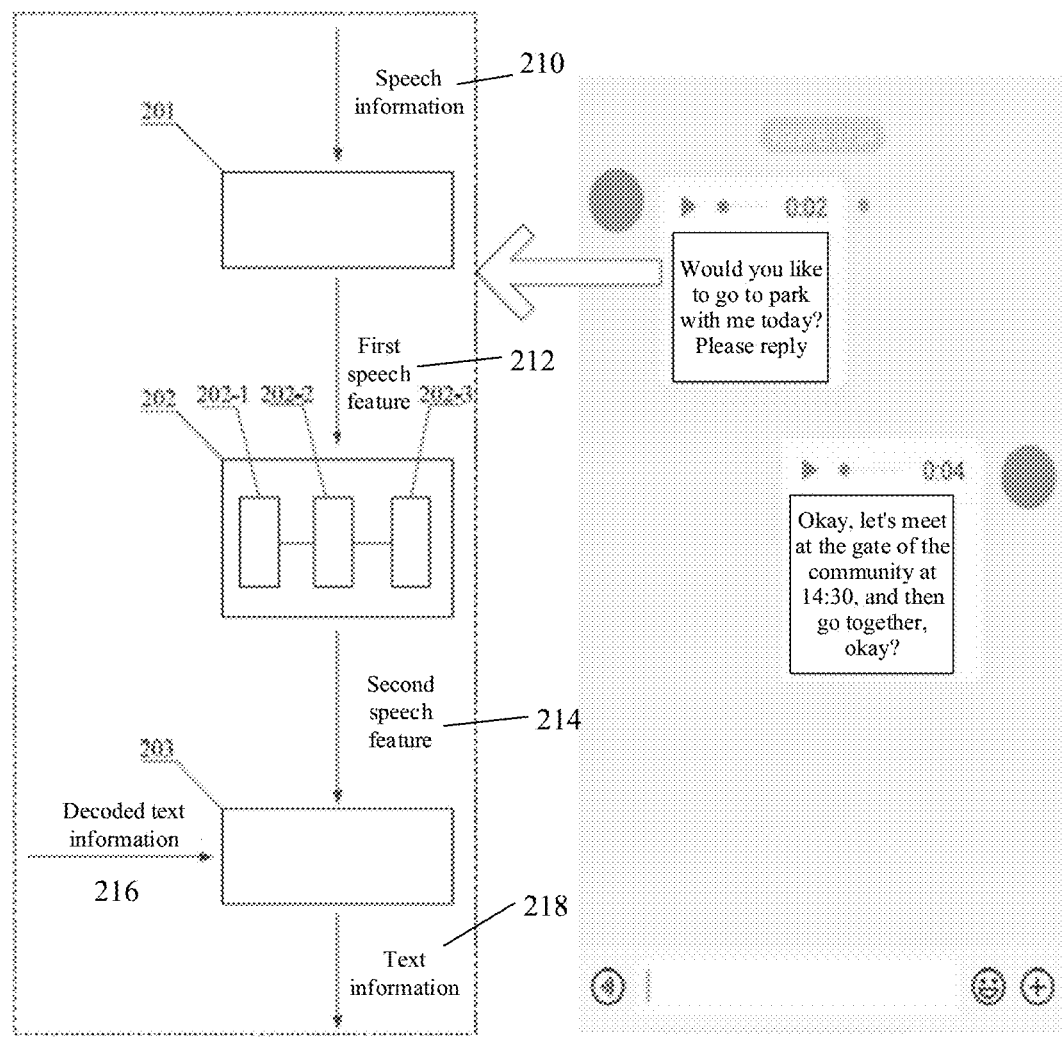
FIG. 2 is a schematic diagram of an embodiment of a second application scenario of an audio information processing method according to this application.

The audio information processing method provided in an embodiment of this application can be applied to a speech-to-text scenario. FIG. 2 is a schematic diagram of an embodiment of a second application scenario of the audio information processing method according to this application. In this embodiment of the second scenario of this application, the audio information processing method provided in this application is described in detail by using an application scenario as an example in which the audio information processing method provided in this application is applied to social software for speech-to-text conversion. In this embodiment of the second application scenario of this application, the audio information is speech information.

When converting received speech information into text information, the social software first sends the speech information to a speech recognition system for speech recognition on the speech information by the speech recognition system. Specifically, the speech recognition system includes a speech feature extraction module 201, an encoding module 202, and a decoding module 203. A process of recognizing the speech information by the speech recognition system is as follows:

Firstly, the speech feature extraction module 201 performs feature extraction on the speech information 210 to obtain a first speech feature 212 corresponding to the speech information, and further provides the first speech feature 212 to the encoding module 202.

Secondly, after obtaining the first speech feature 212, the encoding module 202 sequentially performs linear transformation on the first speech feature 212 through a linear projection layer 202-1 in the encoding module 202, to obtain a linear speech feature of the first speech feature, and performs linear rectification on the linear speech feature of the first speech feature through a linear rectification layer 202-2, to obtain a nonlinear speech feature of the first speech feature.

Thirdly, N encoding layers 202-3 in the encoding module 202 perform, based on a speech feature at a specified moment in the first speech feature and speech features adjacent to the speech feature at the specified moment, an encoding on the speech feature at the specified moment, to obtain a second speech feature 214 corresponding to the speech information 210.

Finally, the decoding module 203 obtains decoded text information 216 corresponding to the speech information 210 and a second speech feature 214, and based on the second speech feature 214 and the decoded text information 216, obtains text information 218 corresponding to the speech information.

It should be noted that the foregoing two application scenarios are merely two embodiments of application scenarios of the audio information processing method provided in this application. The purpose of providing the two embodiments of application scenarios is to facilitate understanding of the audio information processing method provided in this application, but not to limit the audio information processing method provided in this application. A first embodiment of this application provides a method for displaying content of an electronic reading object on a handheld device, which will be described below with reference to FIG. 1 to FIG. 6.

Figure 3:
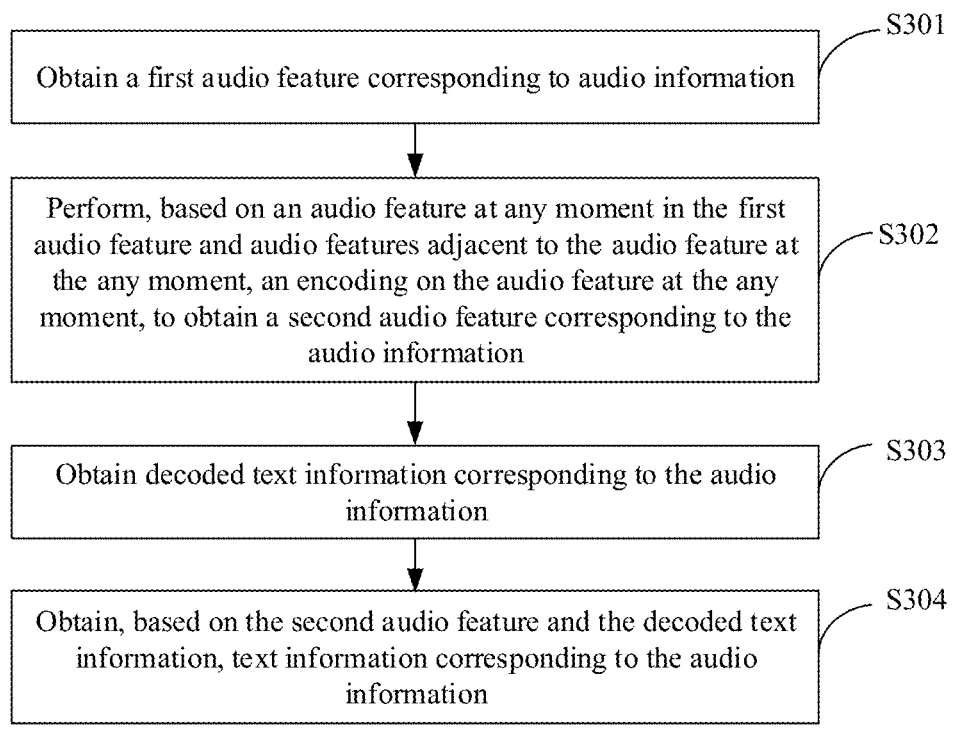
FIG. 3 is a flowchart of an audio information processing method according to a first embodiment of this application.
Figure 4:
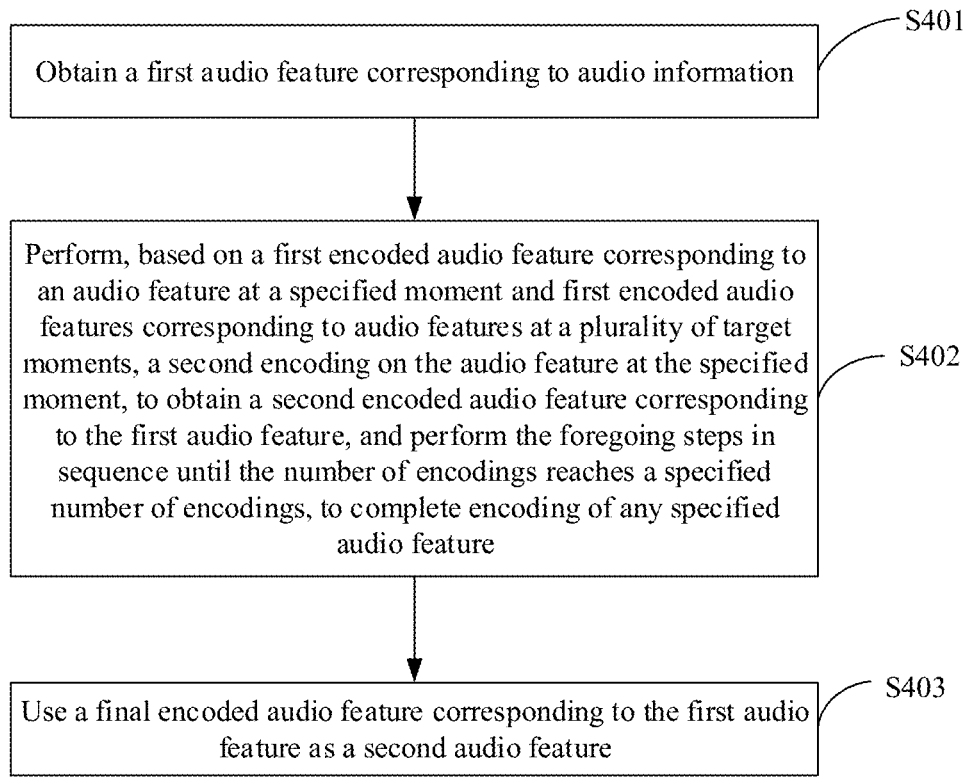
FIG. 4 is a flowchart of a method for performing an encoding on an audio feature at a specified moment according to the first embodiment of this application.
Figure 5:
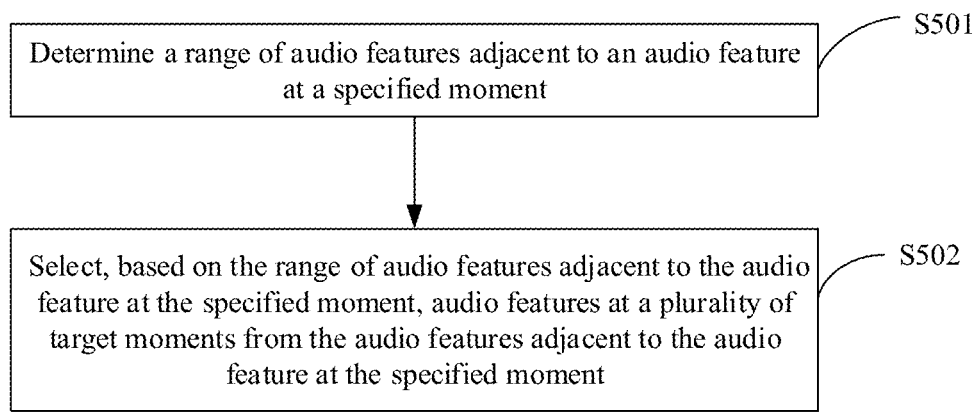
FIG. 5 is a flowchart of a method for selecting audio features at a plurality of target moments according to the first embodiment of this application.
Figure 6:
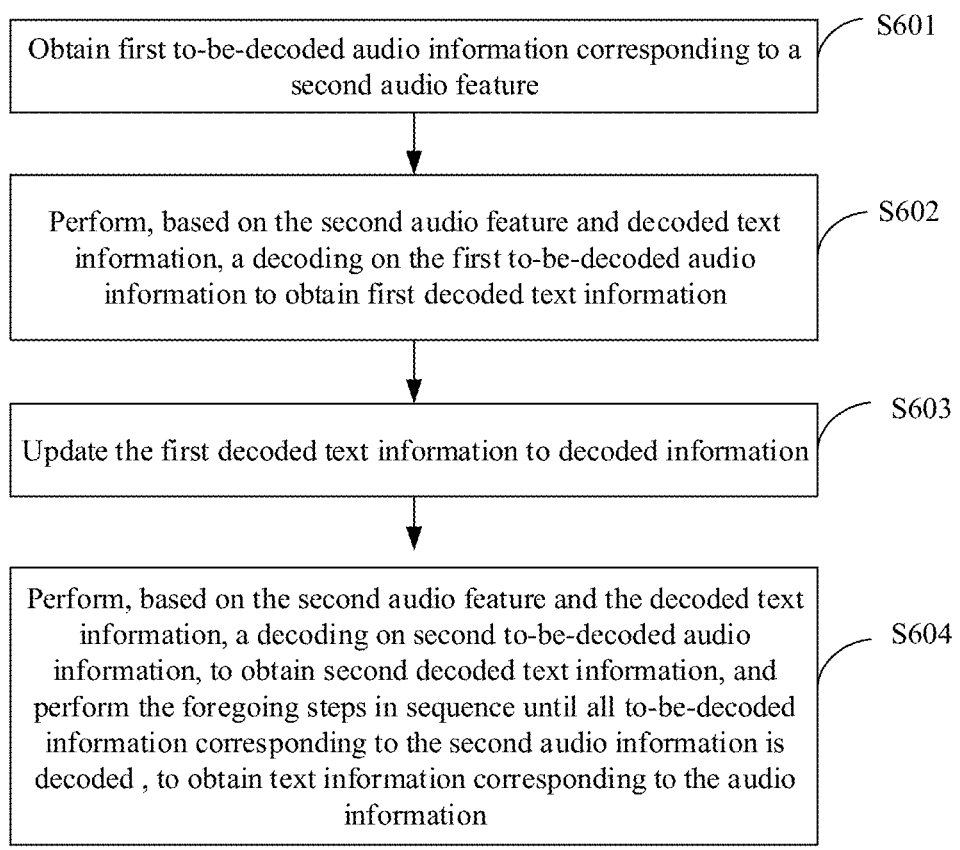
FIG. 6 is a flowchart of a method for obtaining text information corresponding to audio information according to the first embodiment of this application.

FIG. 3 is a flowchart of an audio information processing method according to the first embodiment of this application.

In step S301, a first audio feature corresponding to audio information is obtained.

An audio feature includes a phonetic feature of an audio, a spectral feature of the audio, and the like. The audio information in the first embodiment of this application is generally speech information from a person, speech information from an audio device such as a sound of a song, and the like.

Specific steps for obtaining a first audio feature corresponding to audio information are: obtaining the audio information; and performing feature extraction on the audio information to obtain the first audio feature, where the performing feature extraction on the audio information to obtain the first audio feature includes: performing feature extraction on the audio information to obtain a first audio feature sequence corresponding to the audio information, that is, to obtain an audio feature of the audio information in N speech frames.

In step S302, an encoding is performed on an audio feature at a specified moment based on the audio feature at the specified moment in the first audio feature and audio features adjacent to the audio feature at the specified moment, to obtain a second audio feature corresponding to the audio information.

In the first embodiment of this application, a process of performing an encoding on the audio feature at the specified moment is to input the audio feature at the specified moment and the audio features adjacent to the audio feature at the specified moment into an encoder for linear and non-linear transformation, so as to perform feature attribute dimension reduction on the first audio feature and obtain an expression of a new audio feature. In the first embodiment of this application, second audio feature information is audio feature information obtained by performing an encoding on the first audio feature.

A process of performing, based on an audio feature at a specified moment in the first audio feature and audio features adjacent to the audio feature at the specified moment, an encoding on the audio feature at the specified moment is as follows: selecting audio features at a plurality of target moments from the audio features adjacent to the audio feature at the specified moment; and performing, based on the audio feature at the specified moment and the audio features at the plurality of the target moments, an encoding on the audio feature at the specified moment. For a process of performing, based on the audio feature at the specified moment and the audio features at the plurality of the target moments, an encoding on the audio feature at the specified moment, refer to FIG. 4, which is a flowchart of a method for performing an encoding on an audio feature at a specified moment according to the first embodiment of this application.

In step S401, a first encoding is performed on the audio feature at the specified moment based on the audio feature at the specified moment and the audio features at the plurality of the target moments, to obtain a first encoded audio feature corresponding to the first audio feature.

The performing, based on the audio feature at the specified moment and the audio features at the plurality of the target moments, a first encoding on the audio feature at the specified moment, to obtain a first encoded audio feature corresponding to the first audio feature includes: performing the first encoding based on a linear audio feature at the specified moment, a nonlinear audio feature at the specified moment, linear audio features at the plurality of the target moments, and nonlinear audio features at the plurality of the target moments, to obtain the first encoded audio feature corresponding to the first audio feature.

In step S402, a second encoding is performed on the audio feature at the specified moment based on a first encoded audio feature corresponding to the audio feature at the specified moment and first encoded audio features corresponding to the audio features at the plurality of the target moments, to obtain a second encoded audio feature corresponding to the first audio feature, and the foregoing steps are performed in sequence until the number of encodings reaches a specified number of encodings, to complete encoding of the audio feature at the specified moment.

The number of encodings is related to an audio length. In the first embodiment of this application, in obtaining the first audio feature corresponding to the audio information, an audio feature of one frame of audio information is generally extracted every 10 milliseconds (ms). For example, 600 frames of audio features can be extracted from 6-second audio information, to obtain the first audio feature corresponding to the audio information. After the first audio feature corresponding to the audio information is obtained, because the 600 frames of audio features in the first audio feature corresponding to the audio information are the audio features of non-adjacent frames, splicing processing and sampling processing of adjacent frames are performed for the 600 frames of audio features in the first audio feature in obtaining the second audio feature corresponding to the audio information. If a sampling rate is 6, the 600 frames of audio features will be further converted into an audio feature spliced from 100 frames. In converting the 600 frames of audio features into the audio feature spliced from 100 frames, an encoding is performed on an audio feature at any specified moment, and the number of encodings is also 100.

In the first embodiment of this application, processes of performing a second to an N-th encodings on the audio feature at the specified moment are similar. Therefore, only a process of performing a second encoding on the audio feature at the specified moment is described in detail in the first embodiment of this application. The performing, based on a first encoded audio feature corresponding to the audio feature at the specified moment and first encoded audio features corresponding to the audio features at the plurality of the target moments, a second encoding on the audio feature at the specified moment, to obtain a second encoded audio feature corresponding to the first audio feature includes: performing the second encoding based on a first encoded linear audio feature corresponding to the audio feature at the specified moment, a first encoded nonlinear audio feature corresponding to the audio feature at the specified moment, first encoded linear audio features corresponding to the audio features at the plurality of the target moments, and first encoded nonlinear audio features corresponding to the audio features at the plurality of the target moments, to obtain the second encoded audio feature corresponding to the first audio feature.

Because linear audio features and nonlinear audio features are used in each encoding process, the second encoding performed on the audio feature at the specified moment is specifically described. Before performing the second encoding on the audio feature at the specified moment, the method also performs linear transformation on the first encoded audio feature corresponding to the first audio feature to obtain a first encoded linear audio feature corresponding to the first audio feature; and performs linear rectification on the first encoded linear audio feature corresponding to the first audio feature, to obtain a first encoded nonlinear audio feature corresponding to the first audio feature.

In the first embodiment of this application, a ReLU function (Rectified Linear Unit, rectified linear function) is generally used to perform linear rectification on linear audio features to obtain nonlinear audio features.

In a process of performing step S302, the audio features at the plurality of the target moments are selected from the audio features adjacent to the audio feature at the specified moment. In the first embodiment of this application, for the step of selecting audio features at the plurality of the target moments from the audio features adjacent to the audio feature at the specified moment, refer to FIG. 5, which is a flowchart of a method for selecting audio features at a plurality of target moments according to the first embodiment of this application.

In step S501, a range of audio features adjacent to an audio feature at a specified moment is determined.

The determining a range of audio features adjacent to an audio feature at a specified moment includes: determining a first range of audio features that are adjacent to the audio feature at the specified moment and before the audio feature at the specified moment, and determining a second range of audio features that are adjacent to the audio feature at the specified moment and after the audio feature at the specified moment.

In step S502, audio features at a plurality of target moments are selected from the audio features adjacent to the audio feature at the specified moment based on the range of the audio features adjacent to the audio feature at the specified moment.

The selecting, based on the range of the audio features adjacent to the audio feature at the specified moment, audio features at a plurality of target moments from the audio features adjacent to the audio feature at the specified moment includes: selecting, based on the first range and the second range, the audio features at the plurality of the target moments from the audio features adjacent to the audio feature at the specified moment. Specifically, in selecting, based on the first range and the second range, the audio features at the plurality of the target moments from the audio features adjacent to the audio feature at the specified moment, the method first determines a step factor, where the step factor is used to indicate a value-taking time interval when the audio features at the plurality of the target moments are selected from the audio features adjacent to the audio features of the specified moment; and then select, based on the step factor, the first range, and the second range, the audio features at the plurality of the target moments from the audio features adjacent to the audio feature at the specified moment.

It should be noted that the selecting, based on the step factor, first range, and the second range, the audio features at the plurality of the target moments from the audio features adjacent to the audio feature at the specified moment includes: selecting, based on a first step factor and the first range, the audio features at the plurality of the target moments from the audio features adjacent to the audio feature at the specified moment.

It should be noted that the selecting, based on the step factor, the first range, and the second range, the audio features at the plurality of the target moments from the audio features adjacent to the audio feature at the specified moment includes: selecting, based on a second step factor and the second range, the audio features at the plurality of the target moments from the audio features adjacent to the audio feature at the specified moment.

In step S403, a final encoded audio feature corresponding to the first audio feature is used as a second audio feature.

After the second audio feature is obtained, text information corresponding to the audio information is further obtained based on the second audio feature.

In step S303, decoded text information corresponding to the audio information is obtained.

In the first embodiment of this application, the decoded text information may be text information that corresponds to the audio information and that has been obtained before a current moment. When no text information corresponding to the audio information has been obtained before the current moment, the decoded text information may alternatively be indication information for indicating decoding of to-be-decoded audio information corresponding to the second audio information.

In step S304, text information corresponding to the audio information is obtained based on the second audio features and the decoded text information.

The obtaining, based on the second audio feature and the decoded text information, text information corresponding to the audio information specifically includes: performing, based on the second audio feature and the decoded text information, a decoding on to-be-decoded audio information corresponding to the second audio information, to obtain the text information corresponding to the audio information. For a specific process, refer to FIG. 6, which is a flowchart of a method for obtaining text information corresponding to audio information according to the first embodiment of this application.

In step S601, first to-be-decoded audio information corresponding to a second audio feature is obtained.

In the first embodiment of this application, a decoding process is a process of inputting a decoding result of a previous moment and an encoded expression of an encoder into a decoder to obtain a corresponding decoding output.

In step S602, a decoding is performed on the first to-be-decoded audio information based on the second audio feature and decoded text information, to obtain first decoded text information.

A specific process of performing, based on the second audio feature and decoded text information, a decoding on the first to-be-decoded audio information to obtain first decoded text information is as follows:

firstly, performing, based on the second audio feature and the decoded text information, a decoding on the first to-be-decoded audio information, to obtain text information corresponding to the first to-be-decoded audio information; and then, obtaining, based on the text information corresponding to the first to-be-decoded audio information and the decoded text information, the first decoded text information, that is, obtaining, based on the second audio feature and the decoded text information, a predicted value of a text unit corresponding to the first to-be-decoded audio information; obtaining a probability distribution of the text unit; and obtaining a text unit with a largest probability value as the text information corresponding to the first to-be-decoded audio information.

In step S603, the first decoded text information is updated to decoded information.

In step S604, a decoding is performed on second to-be-decoded audio information based on the second audio feature and the decoded text information, to obtain second decoded text information, and the foregoing steps are performed in sequence until all to-be-decoded information corresponding to the second audio information is decoded, to obtain the text information corresponding to the audio information.

For a process of performing a decoding on the second to M-th to-be-decoded audio information in this application, refer to the process of performing a decoding on the first to-be-decoded audio information in step S602.

The audio information processing method provided in an embodiment of this application firstly obtains a first audio feature corresponding to audio information; secondly, performs, based on an audio feature at a specified moment in the first audio feature and audio features adjacent to the audio feature at the specified moment, an encoding on the audio feature at the specified moment to obtain a second audio feature corresponding to the audio information; thirdly, obtains decoded text information corresponding to the audio information; and finally, obtains, based on the second audio feature and the decoded text information, text information corresponding to the audio information. The audio information processing method provided in an embodiment of this application can perform, based on the audio feature at the specified moment in the first audio feature and the audio features adjacent to the audio feature at the specified moment, an encoding on the audio feature at the specified moment in the first audio feature, to obtain the second audio feature corresponding to the audio information, and further based on the second audio feature and the decoded text information, obtain the text information corresponding to the audio information. According to the audio information processing method provided in an embodiment of this application, fewer parameters need to be used in the process of obtaining the second audio feature and obtaining, based on the second audio feature and the decoded text information, the text information corresponding to the audio information, thereby reducing computational complexity in the audio information processing process and improving audio information processing efficiency.

The audio information processing method provided in the first embodiment of this application further includes: outputting the text information corresponding to the audio information.

Second Embodiment

In correspondence to the audio information processing method in the first embodiment of this application, a second embodiment of this application provides an audio information processing apparatus. The apparatus embodiment is essentially similar to the first embodiment of the method. Therefore, descriptions of this embodiment are relatively simple. For related content, refer to related descriptions of the method embodiment. The apparatus embodiment described below is merely illustrative.

Figure 7:
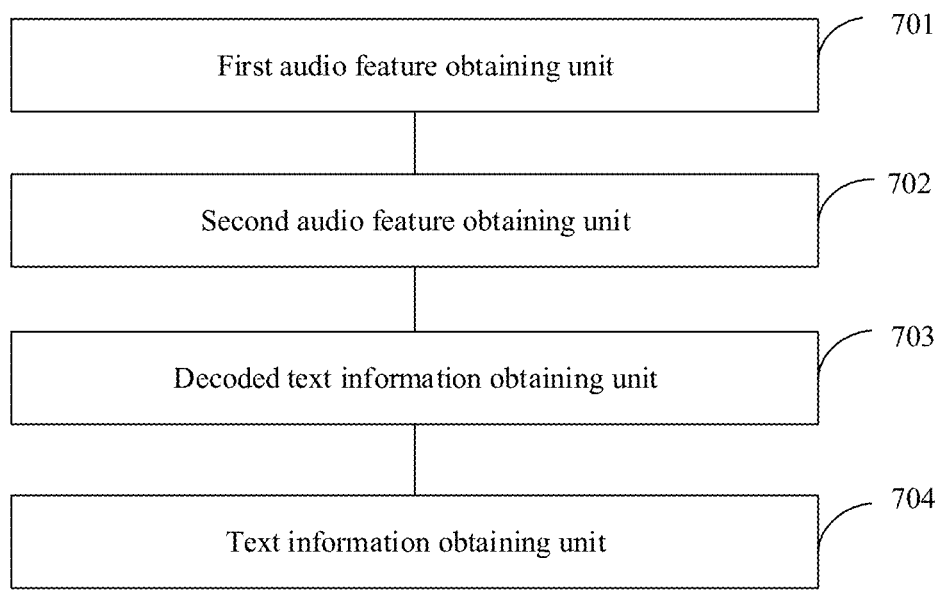
FIG. 7 is a schematic diagram of an audio information processing apparatus according to a second embodiment of this application.

FIG. 7 is a schematic diagram of an audio information processing apparatus according to a second embodiment of this application.

The audio information processing apparatus includes:
a first audio feature obtaining unit 701, adapted to obtain a first audio feature corresponding to audio information;
a second audio feature obtaining unit 702, adapted to perform, based on an audio feature at a specified moment in the first audio feature and audio features adjacent to the audio feature at the specified moment, an encoding on the audio feature at the specified moment, to obtain a second audio feature corresponding to the audio information;
a decoded text information obtaining unit 703, adapted to obtain decoded text information corresponding to the audio information; and
a text information obtaining unit 704, adapted to obtain, based on the second audio feature and the decoded text information, text information corresponding to the audio information.

Optionally, the second audio feature obtaining unit 702 is specifically adapted to select audio features at a plurality of target moments from the audio features adjacent to the audio feature at the specified moment; and perform, based on the audio feature at the specified moment and the audio features at the plurality of the target moments, an encoding on the audio feature at the specified moment.

Optionally, the performing, based on the audio feature at the specified moment and the audio features at the plurality of the target moments, an encoding on the audio feature at the specified moment includes:
performing, based on the audio feature at the specified moment and the audio features at the plurality of the target moments, a first encoding on the audio feature at the specified moment, to obtain a first encoded audio feature corresponding to the first audio feature;
performing, based on a first encoded audio feature corresponding to the audio feature at the specified moment and first encoded audio features corresponding to the audio features at the plurality of the target moments, a second encoding on the audio feature at the specified moment, to obtain a second encoded audio feature corresponding to the first audio feature, and performing the foregoing steps in sequence until the number of encodings reaches a specified number of encodings, to complete encoding of the audio feature at the specified moment; and
using a final encoded audio feature corresponding to the first audio feature as the second audio feature.

Optionally, the performing, based on the audio feature at the specified moment and the audio features at the plurality of the target moments, a first encoding on the audio feature at the specified moment, to obtain a first encoded audio feature corresponding to the first audio feature includes: performing the first encoding based on a linear audio feature at the specified moment, a nonlinear audio feature at the specified moment, linear audio features at the plurality of the target moments, and nonlinear audio features at the plurality of the target moments, to obtain the first encoded audio feature corresponding to the first audio feature.

Optionally, the performing, based on a first encoded audio feature corresponding to the audio feature at the specified moment and first encoded audio features corresponding to the audio features at the plurality of the target moments, a second encoding on the audio feature at the specified moment, to obtain a second encoded audio feature corresponding to the first audio feature includes: performing the second encoding based on a first encoded linear audio feature corresponding to the audio feature at the specified moment, a first encoded nonlinear audio feature corresponding to the audio feature at the specified moment, first encoded linear audio features corresponding to the audio features at the plurality of the target moments, and first encoded nonlinear audio features corresponding to the audio features at the plurality of the target moments, to obtain the second encoded audio feature corresponding to the first audio feature.

Optionally, the audio information processing method further includes:

performing linear transformation on the first encoded audio feature corresponding to the first audio feature, to obtain a first encoded linear audio feature corresponding to the first audio feature; and performing linear rectification on the first encoded linear audio feature corresponding to the first audio feature, to obtain a first encoded nonlinear audio feature corresponding to the first audio feature.

Optionally, the selecting audio features at a plurality of target moments from the audio features adjacent to the audio feature at the specified moment includes:

determining a range of the audio features adjacent to the audio feature at the specified moment; and selecting, based on the range of the audio features adjacent to the audio feature at the specified moment, the audio features at the plurality of the target moments from the audio features adjacent to the audio feature at the specified moment.

Optionally, the determining a range of the audio features adjacent to the audio feature at the specified moment includes: determining a first range of audio features that are adjacent to the audio feature at the specified moment and before the audio feature at the specified moment, and determining a second range of audio features that are adjacent to the audio feature at the specified moment and after the audio feature at the specified moment; and the selecting, based on the range of the audio features adjacent to the audio feature at the specified moment, the audio features at the plurality of the target moments from the audio features adjacent to the audio feature at the specified moment includes: selecting, based on the first range and the second range, the audio features at the plurality of the target moments from the audio features adjacent to the audio feature at the specified moment.

Optionally, the selecting, based on the first range and the second range, the audio features at the plurality of the target moments from the audio features adjacent to the audio feature at the specified moment includes:

determining a step factor, where the step factor is used to indicate a value-taking time interval when the audio features at the plurality of the target moments are selected from the audio features adjacent to the audio features of the specified moment; and selecting, based on the step factor, the first range, and the second range, the audio features at the plurality of the target moments from the audio features adjacent to the audio feature at the specified moment.

Optionally, the selecting, based on the step factor, the first range, and the second range, the audio features at the plurality of the target moments from the audio features adjacent to the audio feature at the specified moment includes: selecting, based on a first step factor and the first range, the audio features at the plurality of the target moments from the audio features adjacent to the audio feature at the specified moment.

Optionally, the selecting, based on the step factor, the first range, and the second range, the audio features at the plurality of the target moments from the audio features adjacent to the audio feature at the specified moment includes: selecting, based on a second step factor and the second range, the audio features at the plurality of the target moments from the audio features adjacent to the audio feature at the specified moment.

Optionally, the text information obtaining unit 704 is specifically adapted to perform, based on the second audio feature and the decoded text information, a decoding on to-be-decoded audio information corresponding to second audio information, to obtain the text information corresponding to the audio information.

Optionally, the performing, based on the second audio feature and the decoded text information, a decoding on to-be-decoded audio information corresponding to second audio information, to obtain the text information corresponding to the audio information includes:

obtaining first to-be-decoded audio information corresponding to the second audio feature;

performing, based on the second audio feature and the decoded text information, a decoding on the first to-be-decoded audio information, to obtain first decoded text information;

obtaining second to-be-decoded audio information corresponding to the second audio feature; updating the first decoded text information to decoded information; and performing, based on the second audio feature and the decoded text information, a decoding on the second to-be-decoded audio information, to obtain second decoded text information, and performing the foregoing steps in sequence until all to-be-decoded information corresponding to the second audio information is decoded, to obtain the text information corresponding to the audio information.

Optionally, the decoded information includes indication information for indicating decoding of to-be-decoded audio information corresponding to the second audio information.

Optionally, the performing, based on the second audio feature and the decoded text information, a decoding on the first to-be-decoded audio information, to obtain first decoded text information includes:

performing, based on the second audio feature and the decoded text information, a decoding on the first to-be-decoded audio information, to obtain text information corresponding to the first to-be-decoded audio information; and obtaining, based on the text information corresponding to the first to-be-decoded audio information and the decoded text information, the first decoded text information.

Optionally, the performing, based on the second audio feature and the decoded text information, a decoding on the first to-be-decoded audio information, to obtain text information corresponding to the first to-be-decoded audio information includes: obtaining, based on the second audio feature and the decoded text information, a predicted value of a text unit corresponding to the first to-be-decoded audio information;

obtaining a probability distribution of the text unit; and obtaining a text unit with a largest probability value as the text information corresponding to the first to-be-decoded audio information.

Optionally, the first audio feature obtaining unit 701 is specifically adapted to obtain the audio information; and perform feature extraction on the audio information to obtain the first audio feature.

Optionally, the performing feature extraction on the audio information to obtain the first audio feature includes: performing feature extraction on the audio information to obtain a first audio feature sequence corresponding to the audio information.

Optionally, the audio information processing apparatus further includes a text information output unit, adapted to output the text information corresponding to the audio information.

The audio information processing apparatus provided in the second embodiment of this application firstly obtains a first audio feature corresponding to audio information; secondly, performs, based on an audio feature at a specified moment in the first audio feature and audio features adjacent to the audio feature at the specified moment, an encoding on the audio feature at the specified moment to obtain a second audio feature corresponding to the audio information; thirdly, obtains decoded text information corresponding to the audio information; and finally, obtains, based on the second audio feature and the decoded text information, text information corresponding to the audio information. The audio information processing apparatus provided in this application can perform, based on the audio feature at the specified moment in the first audio feature and the audio features adjacent to the audio feature at the specified moment, an encoding on the audio feature at the specified moment in the first audio feature, to obtain the second audio feature corresponding to the audio information, and further based on the second audio feature and the decoded text information, obtain the text information corresponding to the audio information. According to the audio information processing apparatus provided in this application, fewer parameters need to be used in the process of obtaining the second audio feature and obtaining, based on the second audio feature and the decoded text information, the text information corresponding to the audio information, thereby reducing computational complexity in the audio information processing process and improving audio information processing efficiency.

Third Embodiment

In correspondence to the audio information processing method in the first embodiment of this application, a third embodiment of this application provides an electronic device.

Figure 8:
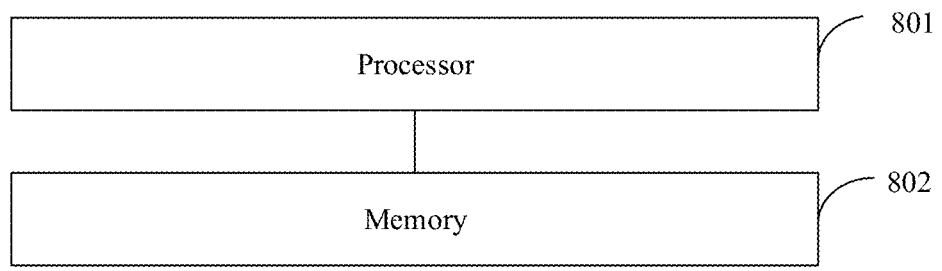
FIG. 8 is a schematic diagram of an electronic device according to an embodiment of this application.

As shown in FIG. 8, FIG. 8 is a schematic diagram of an electronic device (e.g., a computing device) according to an embodiment of this application. The electronic device includes:

a processor 801; and a memory 802 coupled with the processor, the memory adapted or operable to store a computer program, where after being powered and running the computer program via the processor, the device performs the audio information processing method in the first embodiment of this application.

The electronic device of FIG. 8 provided in the third embodiment of this application firstly obtains a first audio feature corresponding to audio information; secondly, performs, based on an audio feature at a specified moment in the first audio feature and audio features adjacent to the audio feature at the specified moment, an encoding on the audio feature at the specified moment to obtain a second audio feature corresponding to the audio information; thirdly, obtains decoded text information corresponding to the audio information; and finally, obtains, based on the second audio feature and the decoded text information, text information corresponding to the audio information. The electronic device for audio information processing provided in this application can perform, based on the audio feature at the specified moment in the first audio feature and the audio features adjacent to the audio feature at the specified moment, an encoding on the audio feature at the specified moment in the first audio feature, to obtain the second audio feature corresponding to the audio information, and further based on the second audio feature and the decoded text information, obtain the text information corresponding to the audio information. According to the electronic device for audio information processing provided in this application, fewer parameters need to be used in the process of obtaining the second audio feature and obtaining, based on the second audio feature and the decoded text information, the text information corresponding to the audio information, thereby reducing computational complexity in the audio information processing process and improving audio information processing efficiency.

It should be noted that, for detailed descriptions of the audio information processing method performed by the electronic device provided in the third embodiment of this application, reference may be made to related descriptions in the first embodiment of this application, and details are not described herein again.

Fourth Embodiment

In correspondence to the audio information processing method in the first embodiment of this application, a fourth embodiment of this application provides a storage medium or device, where the storage medium stores a computer program, and when the computer program is executed by a processor, the audio information processing method in the first embodiment of this application is performed.

The storage medium or device provided in the fourth embodiment of this application firstly obtains a first audio feature corresponding to audio information; secondly, performs, based on an audio feature at a specified moment in the first audio feature and audio features adjacent to the audio feature at the specified moment, an encoding on the audio feature at the specified moment to obtain a second audio feature corresponding to the audio information; thirdly, obtains decoded text information corresponding to the audio information; and finally, obtains, based on the second audio feature and the decoded text information, text information corresponding to the audio information. The storage medium for audio information processing provided in this application can perform, based on the audio feature at the specified moment in the first audio feature and the audio features adjacent to the audio feature at the specified moment, an encoding on the audio feature at the specified moment in the first audio feature, to obtain the second audio feature corresponding to the audio information, and further based on the second audio feature and the decoded text information, obtain the text information corresponding to the audio information. According to the storage medium for audio information processing provided in this application, fewer parameters need to be used in the process of obtaining the second audio feature and obtaining, based on the second audio feature and the decoded text information, the text information corresponding to the audio information, thereby reducing computational complexity in the audio information processing process and improving audio information processing efficiency.

It should be noted that, for detailed descriptions of the storage medium or device provided in the fourth embodiment of this application, reference may be made to related descriptions in the first embodiment of this application, and details are not described herein again.

Fifth Embodiment

In the first embodiment of this application, an audio information processing method is provided, and in correspondence to the audio information processing method, a fifth embodiment of this application provides a smart speaker.

The smart speaker provided in the fifth embodiment of this application includes: an audio collection device and an audio recognition device, where the audio recognition device includes: an audio feature extraction module, an audio feature encoding module, a decoded text storage module, and an audio feature encoding module; the audio collection device is adapted to obtain audio information;

the audio feature extraction module is adapted to obtain a first audio feature corresponding to the audio information;

the audio feature encoding module is adapted to perform, based on an audio feature at a specified moment in the first audio feature and audio features adjacent to the audio feature at the specified moment, an encoding on the audio feature at the specified moment, to obtain a second audio feature corresponding to the audio information;

the decoded text storage module is adapted to obtain decoded text information corresponding to the audio information; and the audio feature encoding module is adapted to obtain, based on the second audio feature and the decoded text information, text information corresponding to the audio information.

Sixth Embodiment

In the first embodiment of this application, an audio information processing method is provided, and in correspondence to the audio information processing method, a sixth embodiment of this application provides an in-vehicle smart speech interaction apparatus.

The in-vehicle smart speech interaction apparatus provided in the sixth embodiment of this application includes: an audio collection device, an audio recognition device, and an execution device, where the audio recognition device includes: an audio feature extraction module, an audio feature encoding module, a decoded text storage module, and an audio feature encoding module;

the audio collection device is adapted to obtain audio information;

the audio feature extraction module is adapted to obtain a first audio feature corresponding to the audio information;

the audio feature encoding module is adapted to perform, based on an audio feature at a specified moment in the first audio feature and audio features adjacent to the audio feature at the specified moment, an encoding on the audio feature at the specified moment, to obtain a second audio feature corresponding to the audio information;

the decoded text storage module is adapted to obtain decoded text information corresponding to the audio information;

the audio feature encoding module is adapted to obtain, based on the second audio feature and the decoded text information, text information corresponding to the audio information; and the execution device is adapted to execute, based on the text information corresponding to the audio information, a corresponding instruction.

Seventh Embodiment

In the first embodiment of this application, an audio information processing method is provided, and in correspondence to the audio information processing method, a seventh embodiment of this application provides an audio information processing system.

The audio information processing method provided in the seventh embodiment of this application includes: a client and a server, where the client is adapted to obtain audio information and send the audio information to the server; and the server is adapted to: obtain a first audio feature corresponding to the audio information; perform, based on an audio feature at a specified moment in the first audio feature and audio features adjacent to the audio feature at the specified moment, an encoding on the audio feature at the specified moment, to obtain a second audio feature corresponding to the audio information; obtain decoded text information corresponding to the audio information; obtain, based on the second audio feature and the decoded text information, text information corresponding to the audio information; and send the text information corresponding to the audio information to the client.

Although this application is disclosed as above with preferred embodiments, these preferred embodiments are not intended to limit this application. Any person skilled in the art can make possible changes and modifications without departing from the spirit and scope of this application. Therefore, the protection scope of this application should be subjected to the scope defined by the claims of this application.

In a typical configuration, the computing device includes one or more processors (CPU), an input/output interface, a network interface, and a memory.

The memory may include a form of a non-permanent memory such as a random access memory (RAM) and/or a non-volatile memory such as a read-only memory (ROM) or a flash memory (flash RAM) in computer-readable media. The memory is an example of the computer-readable medium.

Computer-readable media include permanent and non-permanent, removable and non-removable media, and information storage may be implemented by any method or technology. The information may be computer-readable instructions, an information structure, a program module, or other information. Examples of computer storage media include, but are not limited to, a phase-change memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a magnetic cassette, a magnetic tape, a magnetic disk storage or other magnetic storage devices, or any other non-transmission media, which can be used to store information that can be accessed by a computing device. As defined in this specification, the computer-readable medium does not include transitory computer-readable media (transitory media), such as modulated information signals and carriers.

A person skilled in the art should understand that the embodiments of this application can be provided as a method, a system, or a computer program product. Therefore, this application may use a form of hardware only embodiments, software only embodiments, or software-hardware combined embodiments. Moreover, this application may use a form of a computer program product that is implemented on one or more computer-usable storage media (including but not limited to disk memories, CD-ROMs, optical memories, and the like) that include computer usable program code.

What is claimed is:

1. An audio information processing method, comprising:
obtaining a first audio feature corresponding to audio information;
performing, based on an audio feature at a specified moment in the first audio feature and audio features adjacent to the audio feature at the specified moment, an encoding on the audio feature at the specified moment, to obtain a second audio feature corresponding to the audio information[;], wherein the performing the encoding on the audio feature at the specified moment comprises:
 selecting audio features at a plurality of target moments from the audio features adjacent to the audio feature at the specified moment; and
 performing, based on the audio feature at the specified moment and the audio features at the plurality of the target moments, an encoding on the audio feature at the specified moment;
obtaining decoded text information corresponding to the audio information; and
obtaining, based on the second audio feature and the decoded text information, text information corresponding to the audio information.

2. The audio information processing method according to claim 1, wherein the selecting audio features at a plurality of target moments from the audio features adjacent to the audio feature at the specified moment comprises:
determining a range of the audio features adjacent to the audio feature at the specified moment; and
selecting, based on the range of the audio features adjacent to the audio feature at the specified moment, the audio features at the plurality of the target moments from the audio features adjacent to the audio feature at the specified moment.

3. The audio information processing method according to claim 2, wherein the determining a range of the audio features adjacent to the audio feature at the specified moment comprises: determining a first range of audio features that are adjacent to the audio feature at the specified moment and before the audio feature at the specified moment, and determining a second range of audio features that are adjacent to the audio feature at the specified moment and after the audio feature at the specified moment; and
the selecting, based on the range of the audio features adjacent to the audio feature at the specified moment, the audio features at the plurality of the target moments from the audio features adjacent to the audio feature at the specified moment comprises: selecting, based on the first range and the second range, the audio features at the plurality of the target moments from the audio features adjacent to the audio feature at the specified moment.

4. The audio information processing method according to claim 3, wherein the selecting, based on the first range and the second range, the audio features at the plurality of the target moments from the audio features adjacent to the audio feature at the specified moment comprises:
determining a step factor, wherein the step factor is used to indicate a value-taking time interval when the audio features at the plurality of the target moments are selected from the audio features adjacent to the audio features of the specified moment; and
selecting, based on the step factor, the first range, and the second range, the audio features at the plurality of the target moments from the audio features adjacent to the audio feature at the specified moment.

5. The audio information processing method according to claim 4, wherein the selecting, based on the step factor, the first range, and the second range, the audio features at the plurality of the target moments from the audio features adjacent to the audio feature at the specified moment comprises: selecting, based on a first step factor and the first range, the audio features at the plurality of the target moments from the audio features adjacent to the audio feature at the specified moment.

6. The audio information processing method according to claim 1, wherein the obtaining, based on the second audio feature and the decoded text information, text information corresponding to the audio information comprises: performing, based on the second audio feature and the decoded text information, a decoding on to-be-decoded audio information corresponding to the second audio information, to obtain the text information corresponding to the audio information.

7. The audio information processing method according to claim 1, wherein the obtaining a first audio feature corresponding to audio information comprises:
obtaining the audio information; and
performing feature extraction on the audio information to obtain the first audio feature.

8. The audio information processing method according to claim 7, wherein the performing feature extraction on the audio information to obtain the first audio feature comprises: performing feature extraction on the audio information to obtain a first audio feature sequence corresponding to the audio information.

9. The audio information processing method according to claim 1, further comprising: outputting text information corresponding to the audio information.

10. The audio information processing method according to claim 1, wherein the selecting audio features at a plurality of target moments from the audio features adjacent to the audio feature at the specified moment comprises: determining a range of the audio features adjacent to the audio feature at the specified moment.

11. An electronic device, comprising:
a processor; and
a memory coupled with the processor, the memory operable to store a program of an audio information processing method, wherein running the program of the audio information processing method via the processor, the device performs the following:
obtaining a first audio feature corresponding to audio information;
performing, based on an audio feature at a specified moment in the first audio feature and audio features adjacent to the audio feature at the specified moment, an encoding on the audio feature at the specified moment, to obtain a second audio feature corresponding to the audio information;
obtaining decoded text information corresponding to the audio information; and
obtaining, based on the second audio feature and the decoded text information, text information corresponding to the audio information, wherein the obtaining, based on the second audio feature and the decoded text information, text information corresponding to the audio information comprises:

performing, based on the second audio feature and the decoded text information, a decoding on to-be-decoded audio information corresponding to the second audio information, to obtain the text information corresponding to the audio information.

12. The electronic device according to claim 11, further comprising:

outputting the text information corresponding to the audio information.

13. The electronic device according to claim 11, wherein the obtaining a first audio feature corresponding to audio information comprises:

obtaining the audio information; and performing feature extraction on the audio information to obtain the first audio feature.

14. The electronic device according to claim 11, wherein the performing, based on an audio feature at a specified moment in the first audio feature and audio features adjacent to the audio feature at the specified moment, an encoding on the audio feature at the specified moment comprises:

selecting audio features at a plurality of target moments from the audio features adjacent to the audio feature at the specified moment; and performing, based on the audio feature at the specified moment and the audio features at the plurality of the target moments, an encoding on the audio feature at the specified moment.

15. The electronic device according to claim 11, wherein the performing, based on an audio feature at a specified moment in the first audio feature and audio features adjacent to the audio feature at the specified moment, an encoding on the audio feature at the specified moment comprises: selecting audio features at a plurality of target moments from the audio features adjacent to the audio feature at the specified moment.

16. A storage device, storing a program of an audio information processing method, wherein when the program is executed by a processor, the following are performed:

obtaining a first audio feature corresponding to audio information;

performing, based on an audio feature at a specified moment in the first audio feature and audio features adjacent to the audio feature at the specified moment, an encoding on the audio feature at the specified moment, to obtain a second audio feature corresponding to the audio information, wherein the performing the encoding on the audio feature at the specified moment comprises:

selecting audio features at a plurality of target moments from the audio features adjacent to the audio feature at the specified moment; and performing, based on the audio feature at the specified moment and the audio features at the plurality of the target moments, an encoding on the audio feature at the specified moment;

obtaining decoded text information corresponding to the audio information; and obtaining, based on the second audio feature and the decoded text information, text information corresponding to the audio information.

17. The storage device according to claim 16, further comprising: outputting the text information corresponding to the audio information.

18. The storage device according to claim 16, wherein the obtaining a first audio feature corresponding to audio information comprises:

obtaining the audio information; and performing feature extraction on the audio information to obtain the first audio feature.

19. The storage device according to claim 16, wherein the obtaining, based on the second audio feature and the decoded text information, text information corresponding to the audio information comprises: performing, based on the second audio feature and the decoded text information, a decoding on to-be-decoded audio information corresponding to the second audio information, to obtain the text information corresponding to the audio information.

20. The storage device according to claim 16, wherein the selecting audio features at a plurality of target moments from the audio features adjacent to the audio feature at the specified moment comprises: determining a range of the audio features adjacent to the audio feature at the specified moment.

* * * * *